US009686733B2

(12) United States Patent
Delattre et al.

(10) Patent No.: US 9,686,733 B2
(45) Date of Patent: Jun. 20, 2017

(54) COMMUNICATION METHOD IN A WIRELESS TELECOMMUNICATIONS NETWORK, ASSOCIATED COMPUTER PROGRAM AND WIRELESS COMMUNICATION NODE

(71) Applicant: THALES, Neuilly sur Seine (FR)

(72) Inventors: Michel Delattre, Gennevilliers (FR); Guy Bouyssounouse, Gennevilliers (FR)

(73) Assignee: THALES, Neuilly sur Seine (FR)

( * ) Notice: Subject to any disclaimer, the term of this patent is extended or adjusted under 35 U.S.C. 154(b) by 292 days.

(21) Appl. No.: 14/574,828

(22) Filed: Dec. 18, 2014

(65) Prior Publication Data
US 2015/0172995 A1  Jun. 18, 2015

(30) Foreign Application Priority Data
Dec. 18, 2013  (FR) ...................... 13 02991

(51) Int. Cl.
*H04L 12/12* (2006.01)
*H04W 40/30* (2009.01)
(Continued)

(52) U.S. Cl.
CPC ......... *H04W 40/30* (2013.01); *H04L 43/0829* (2013.01); *H04L 45/70* (2013.01);
(Continued)

(58) Field of Classification Search
CPC ........................... H04W 40/30; H04L 43/0829
(Continued)

(56) References Cited

U.S. PATENT DOCUMENTS

2004/0218582 A1  11/2004  Kennedy et al.
2009/0129316 A1   5/2009  Ramanathan et al.
(Continued)

OTHER PUBLICATIONS

S Burleigh, A Hooke, L Torgerson, R Durst, K Scott, H Weiss, Delay-Tolerant Networking Architecture, Dec. 2006.
(Continued)

*Primary Examiner* — Dang Ton
(74) *Attorney, Agent, or Firm* — Davidson, Davidson & Kappel, LLC

(57) ABSTRACT

A communication method in a wireless network is provided. The method includes, during the transmission of a data block from a source node to a destination node, the following steps: a node, having stored a set of segments of the block, selects a first adjacent node; determines an appropriate segment size for a transfer to the first adjacent node; reformats at least one segment from the set of segment(s) based on the determined segment size; and sends at least the reformatted segment to the first determined adjacent node; the method being characterized in that the node detects a modification of the links between the node and its adjacent nodes, and following that detection, selects a second adjacent node, stops the transmission to the first adjacent node of the set of segments stored before the detection, determines an updated appropriate segment size for a transfer to the second determined adjacent node, reformats at least one segment from the set of segment(s) not yet transmitted to the first adjacent node based on the updated size and transmits the at least one reformatted segment to the second adjacent node.

17 Claims, 4 Drawing Sheets

(51) Int. Cl.
  *H04L 12/26* (2006.01)
  *H04L 12/721* (2013.01)
  *H04W 40/34* (2009.01)
  *H04W 84/18* (2009.01)
  *H04L 12/707* (2013.01)
  *H04L 12/703* (2013.01)

(52) U.S. Cl.
  CPC ............ *H04W 40/34* (2013.01); *H04L 45/22* (2013.01); *H04L 45/28* (2013.01); *H04W 84/18* (2013.01)

(58) Field of Classification Search
  USPC .......................................................... 370/338
  See application file for complete search history.

(56) References Cited

U.S. PATENT DOCUMENTS

| | | | | |
|---|---|---|---|---|
| 2010/0077366 | A1* | 3/2010 | Bjesse | G06F 17/5022 716/106 |
| 2015/0172995 | A1* | 6/2015 | Delattre | H04L 43/0829 370/218 |

OTHER PUBLICATIONS

Evan P.C. Jones, Lily Li, Jakub K. Schmidtke, and Paul A.S. Ward, Practical Routing in Delay-Tolerant Networks, Aug. 2007, pp. 943-959.

Joao A. Dias, Joao N. Isento, Joel J. P.C. Rodrigues, Paulo Rogerio Pereira and Jaime Lloret, Performance Implications of Fragmentation Mechanisms on Vehicular Delay-Tolerant Networks, 2011, pp. 436-441.

Clausen, *Optimized Link State Routing Protocol (OLSR)*, The Internet Society (2003).

Cao, *Routing in Delay/Disruption Tolerant Networks: A Taxonomy, Survey and Challenges*, IEEE Communications Surveys & Tutorials, vol. 15, No. 2, Second Quarter 2013.

Scott et al., *Bundle Protocol Specification*, Network Working Group, Request for Comments: 5050, Nov. 2007 (2007).

Worley, *Guidelines for Implementing the Dialog Event Package in User Agents*, SIP, Internet-Draft, Feb. 10, 2007 (2007).

Zhang, *Routing in Intermittently Connected Mobile Ad Hoc Networks and Delay Tolerant Networks: Overview and Challenges*, IEEE Communications Surveys, The Electronic Magazine of Original Peer-Reviewed Survey Articles, 1st Quarter 2006, vol. 8, No. 1 (2006).

\* cited by examiner

COMMUNICATION METHOD IN A WIRELESS TELECOMMUNICATIONS NETWORK, ASSOCIATED COMPUTER PROGRAM AND WIRELESS COMMUNICATION NODE

This claims the benefit of French Patent Application FR 13 02991, filed Dec. 18, 2014 and hereby incorporated by reference herein.

The present invention relates to a communication method in a wireless telecommunications network comprising wireless telecommunications nodes.

The present invention particularly applies to telecommunications networks, in particular mesh, comprising radio communication links, having heterogeneous (e.g., UHF, VHF) and/or intermittent characteristics.

Mesh networks are networks whose transceiver stations, also called communication nodes, are connected to each other without a central hierarchy, thus forming a net structure. Each node is thus suitable for receiving, sending and relaying data.

BACKGROUND

Traditional networks, for example with an IP ("Internet Protocol") architecture, require the existence of a stable end-to-end path between the source node and a destination node, with a sufficient bandwidth. However, these conditions are sometimes very difficult to obtain, in light of connection problems sometimes encountered between satellites and the ground, or between quickly deployable land means, the number of nodes and their potentially mobile nature. The packets that cannot be relayed by one node to another adjacent node due to a faulty link between the two nodes are destroyed.

The DTN (Delay Tolerant Networking) architecture standardized by the "Internet Engineering Task Force" (IETF) entity in document RFC 4838 and based on the IP architecture is suitable for networks comprising intermittent links. In DTN networks, the data can pause at relay nodes so as, in the case of connection to the next node that is temporarily missing (for example due to the weather or time allocations of resources, etc.), to wait for that link to be available for use again. This architecture requires the use of additional radio resources for the transmission of signaling and encapsulation information.

Also known is Portuguese patent PT104538B, which couples DTN mechanisms with radio link management methods.

SUMMARY OF THE INVENTION

There is a need to allow nodes to transmit data between a source node and a destination node using a minimal volume of communication resources, while reacting to rapid fluctuations and connectivity such as appearances, disappearances, changes in characteristics, links between the nodes, in particular those that are too quick to be taken into account through the distributed routing function of the nodes, which by construction requires a convergence time.

To that end, according to a first aspect, a communication method is provided in a wireless telecommunications network comprising wireless telecommunications nodes, the method comprising, during the transmission of a data block from a source node to a receiving node, the following steps implemented by a node, the node comprising a routing table in a memory of the node and being the source node or a relay node receiving and transmitting at least some segments of the block:

the node, having stored a set of segments of the data block, selects, based on at least one content of its routing table matched with the receiving node and/or depending on states of the wireless telecommunications connections between the node and its adjacent nodes, a first adjacent node from among the nodes adjacent to the node; determines an appropriate segment size for a transfer to the first adjacent node; reformats at least one segment from the set of segment(s) based on the determined segment size; and sends at least the reformatted segment to the first determined adjacent node;

the method being characterized in that the node detects a modification of the routing table and/or a modification of the state of the wireless telecommunications links between the node and its adjacent nodes, and following that detection, selects a second adjacent node, stops the transmission to the first adjacent node of the set of segments stored before the detection, determines an appropriate segment size for a transfer to the second determined adjacent node, reformats at least one segment from the set of segment(s) not yet transmitted to the first adjacent node based on the determined segment size for the transfer to the second adjacent node and transmits the at least one reformatted segment from the set of segments to the second adjacent node.

The communication method according to the invention in some embodiments comprises one or more of the following features:

the node receives messages from the first adjacent node acknowledging receipt by the first node of some of the transmitted segments and does not send the second adjacent node the segments whereof receipt has been acknowledged by the first adjacent node;

when the node has not received a message from the first adjacent node acknowledging proper receipt of the segment transmitted to the first adjacent node, the node transmits the reformatted segment to the second adjacent node following the detection based on the determined segment size for transfer to the second adjacent node;

an appropriate segment size for transfer to an adjacent node is determined based on at least one parameter from among an error rate on the wireless communications link between the node and the adjacent node, a transmission delay on that link, and the maintenance of available resources for another neighbor on the link;

the method comprises the following steps for each node implemented to transmit a block from the source node to the destination node:

each node, following receipt of segments from the data block, stores the received segments in correspondence with their unique reference in the memory of the node;

when a node relays at least some of the segments received from the block to an adjacent node and no segment from the block has been exchanged yet between the node and adjacent node, the node transmits the segments of the block and the unique reference associated with the block; and wherein following the receipt by the node of the unique reference of the block transmitted by an adjacent node with which the node has not yet implemented any exchange of segments of the block, the node indicates the segments of the block already stored in the memory of the node to the adjacent node;

the node maintains, in its memory, in correspondence with the unique reference of the block:
the list of adjacent nodes to which it has relayed segments from the block and stores, in correspondence with each of the adjacent nodes, the segments of the block that it has sent them; and/or
the list of adjacent nodes that have relayed segments from the block to it and stores, in correspondence with each of the adjacent nodes, the segments of the block that it has received from the adjacent node;
the node further indicates, in its memory, in correspondence with the segments of the block relayed to each adjacent node of the list, whether acknowledgments of receipt of the segments from the block by the adjacent node have been received by the node;
the segments of the data block remain stored in the memory of the node as long as a message acknowledging proper receipt of the segments by a node situated N hops away on the route toward the destination node has not been received by the node, N being fixed and greater than or equal to 2;
after receiving segments of a data block sent to several recipient nodes, the node uses the broadcast capabilities of a link with its neighbors so as not to [replicate] the segments to be transmitted;
when segments of the block have already been exchanged between the node and an adjacent node, additional segments of the block are exchanged between them without transmitting the unique reference associated with the block and by transmitting, with the additional segments of the block, a reference of the block, local to the hop between the nodes and adjacent node, the correspondence between the unique reference and the local reference being stored in the memory of the node;
at least some of the segments of a block received by the node comprise a header indicating the address of the adjacent node, but do not comprise a header indicating a destination node address, the node, following the receipt of segments from the block, identifying the destination node used to select an adjacent node to which to transfer the segments each node, by extracting the address from its memory of a destination node previously stored in correspondence with the unique reference of the block.

According to a second aspect, a computer program is provided to be installed in a node of a wireless telecommunications mesh network, the program comprising instructions to carry out the steps of a method according to the first aspect when the program is executed by a processor of the node.

According to a third aspect, a data transceiver set is provided, suitable for constituting a node of a wireless telecommunications mesh network, comprising a wireless transceiver, a memory comprising a routing table, the set being suitable for storing a set of segments of a data block to be transmitted to a destination node and for selecting, based on at least one content of its routing table in correspondence with the destination node and/or based on states of the wireless telecommunications links between the set and its adjacent nodes, a first adjacent node from among the adjacent nodes of the set, in order to determine the segment size appropriate for a transfer to the first selected adjacent node, reformat at least one segment from the set of segment(s) based on the determined segment size, and transmit at least the reformatted segment to the determined first adjacent node via the wireless transceiver;

the set being characterized in it is suitable for detecting a modification of the routing table and/or a modification of the state of the wireless telecommunications links between the set and its adjacent nodes, and following that detection, selecting a second adjacent node, stopping the transmission to the first adjacent node of the set of segments stored before the detection, to determine an appropriate segment size for a transfer to the second determined adjacent node, reformatting at least one segment from the set of segment(s) not yet transmitted to the first adjacent node based on the determined segment size for the transfer to the second adjacent node and transmitting the at least one reformatted segment from the set of segments to the second adjacent node via the wireless transceiver.

BRIEF SUMMARY OF THE DRAWINGS

These features and advantages of the invention will appear upon reading the following description, provided solely as an example, and done in reference to the appended drawings, in which.

DETAILED DESCRIPTION

A data block comprises a block header that in particular indicates the addresses of each end node receiving the block, followed by useful data for delivery to each end destination node.

After the block is segmented as described below, the block header is found in a single segment of the block (or is split into several segments of the block if it is larger than one segment), and the useful data are in turn cut into segment(s), which do not comprise end recipient addresses.

Each data segment or group of data segments transmitted by a radiocommunication node further comprises a header indicating the address of the adjacent relay node(s) of the node toward which the latter has decided to route it.

A block fragment is the result of a reassembly by a relay node of a sequence of blocks segments comprising the same local block reference, which is local to the relay node and its adjacent node(s). A block fragment comprises the header of the block, but does not comprise all of the useful data of the block.

Figure 1:
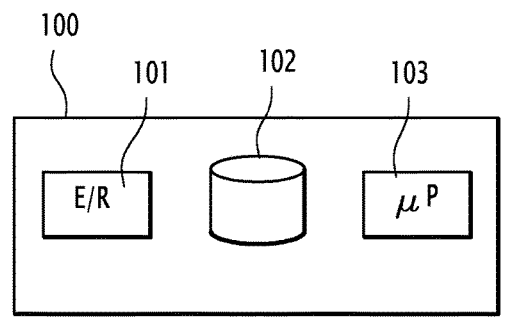
FIG. 1 shows a radio node in one embodiment of the invention.

In FIG. 1 shows a view of a radiofrequency transceiver set 100, suitable for constituting a radiocommunication node of a mesh network in one embodiment of the invention.

The set 100 comprises one or more radiofrequency transceiver modules 101, a memory 102 and a microprocessor 103.

Such a radiofrequency transceiver module 101 is suitable for allowing the radiofrequency transmission (for example, UHF and/or VHF), radiofrequency reception and processing of data transmitted on a mesh network 1, not shown in FIG. 1, according to a given transmission protocol, for example IEEE 802.16j. It in particular comprises a radio link management function allowing a node to detect its adjacent nodes (i.e., the nodes found in its radio coverage area) and determine the state of the radio links between a node and each of its adjacent nodes as well as the state of the radio links between those adjacent nodes and their respective adjacent nodes, via information communicated between the node 100 and its adjacent nodes. This state of the radio links is stored and updated in a "radio background" section of the memory 102, which corresponds to the states of the Link layer, traditionally called L2.

The memory 102 is further suitable for storing a dynamic routing table kept updated by the mesh network 1.

In one embodiment, all or some of the operations indicated below are carried out by the node 100 following the execution on the microprocessor 103 of software instructions stored in the memory 102.

The node 100 is further suitable for receiving a data block as source node and transmitting it to one or more end destination node(s) via the relay nodes of the mesh network 1.

The data block is supplied to the node 100 as source node, for example by a computer application accessing the mesh network 1 via the node 100.

When it receives such a data block, node 100 is suitable for associating a unique block reference with it, designed to identify the block uniquely in the mesh network 1, and to segment the block into block segments whose size is suitable for transmission on the radio links.

As will be outlined hereinafter, this unique reference will be used for identification of the block or the block segments by each node of the network 1 implemented to convey the block or fragments or segments of the block. The node 100 is suitable for storing, in a section of its memory 102 called "block background", in correspondence with the associated unique block reference, the block segments, as well as the address of each end recipient, and for each of those addresses, the transmission states of the segments, for example at n hops away as outlined later.

Furthermore, when the node 100, as source or relay node, transmits a block of data or segments from a block of data to an adjacent node with which it has not yet exchanged that block or segments of that block, the node 100 is further suitable, with that block or the segments (for example, in the header of the first transmitted segment), for transmitting the unique reference of the block as associated with the block in the block background stored in the memory 102, with the identifier of the node 100 added to the chain of the identifiers of the nodes having transmitted the segment to the node 100. The node 100 is further suitable for transmitting, for example a single time, the address of each of the end recipients of the block provided to be reached from that adjacent node association with the unique reference of the block to that adjacent node, that adjacent node then storing the addresses of the recipients in its block background corresponding to that unique block reference. Thus, the addresses of the recipients of the block are in no way transmitted with each segment of the block.

The node 100 is further suitable for indicating, in the block background relative to the block stored in its memory 102, the identifier of the adjacent node in correspondence with the identifier of the segments of the block sent to the adjacent node and the sending time and date, as well as the chain of the identifiers of nodes having relayed those segments. The node 100 is suitable for subsequently entering the segments for which the node 100 has received acknowledgment of proper segment receipt from the adjacent node in the block background associated with the block and stored in its memory 102.

Similarly, the node 100 is able, when it receives a data block or segments of data blocks that are transmitted to it by an adjacent node with which it has not yet received that block or segments of that block, accompanied by the unique reference associated with that block and the addresses of end recipients of the block, to store the received block or block segments in a "block background" section of its memory 102 in correspondence with the received unique block reference and the addresses of the end recipients, further indicating the identifier of the adjacent node having sent the block or block segments and the time and date of receipt.

This unique reference is thus shared by all of the nodes participating in the transmission of the block in the network, unlike the local block references that identify a block and/or its segments at a hop, i.e., a link between two adjacent nodes.

Similarly, node 100 is able, when it receives segments of the data blocks that are transmitted to it by an adjacent node from which it has received segments of the block, to store the received block segments in the block background corresponding to the unique block reference, further indicating the identifier of the adjacent node from which they came and the time and date of receipt for those segments. It will be noted that when this is not the first transmission of segments of a block between those two nodes, it is not necessary to transmit the unique reference again because the correspondence with the unique reference stored in the block background can be done via a reference of the block, transmitted with the segments between the two nodes, and local to the hop between the two nodes.

The node 100 is suitable for maintaining and updating the block background relative to each block associated with a unique block reference until at least one erasure condition is met.

The erasure conditions for a block background comprise a condition depending on the proper progression of the block downstream from the node 100.

For example, the erasure of the background of the block is authorized in the memory of the node 100 if it receives an acknowledgment, stating the unique block reference, of receipt of the block by the destination node or by a node located n hops away (for example, n being set beforehand at an integer greater than or equal to 2) downstream from the node in question on the route toward the destination node.

When the block is intended for several destination nodes, the erasure of the background of the block is authorized when the set of acknowledgments for all of the destination nodes (or by the respective nodes situated n hops away from the node 100 on the route toward the destination nodes) is received.

It is the chain of the identifiers of the upstream nodes placed in the header of the transmitted segment also comprising the unique reference that allows the downstream nodes thus to inform them of the proper progression of the block.

In one embodiment, the erasure of the background of a block in the node 100 depends on the reception by the node 100 of information comprising the unique reference of the block (and not a reference of the block local to a link between two nodes) and indicating a cooperation, regarding the transmission of the segments of the block between the nodes downstream from the node 100 on the route to an end recipient node. Some of these cooperating nodes have transmitted segments that some others of these nodes have not transmitted, yet all of the transmitted segments have, in combination, made it possible to find the entire block on one of the cooperating nodes that can trigger erasure on upstream cooperating nodes. Thus, the erasure is conditional upon the reconstitution of a complete block by a node: this is then a state similar to the initial state where a node possesses the entire block, except that node is situated further downstream from the source node.

In one embodiment, the erasure of the background of the block is further authorized in the memory of the node 100 if a maximum predetermined block flow time has been reached. In fact, a block conveyed too slowly may contain expired data and it is preferable to destroy it, in particular if the block contains an expiration date. The erasure of the block background accompanies the release of the stored segments.

Thus according to embodiments of the invention, one block or at least one segment of a data block is stored on several successive nodes of the route followed by a data block.

In one embodiment, the node 100 is able, when it must transmit (as source node) or relay (as relay node) one or more segments of a block addressed to an end recipient, to determine, during processing of the first segment of a sequence of segments of a block, among adjacent nodes, the adjacent node (adjacent node no. 1) to which it must transmit that sequence of segments, based on the content associated with the recipient in the routing table of the node 100 at the time of that determination, and, if applicable, based on the state of the radio links indicated in the radio background stored in its memory 102 at the time of that determination. The node 100 is able to transmit the first segment of the block to that determined adjacent node during such a routing decision, as well as the following segments of the block, as long as there are no modifications of the routing table or the link states. If applicable, the node 100 applies reformatting to the segments for transmission, as explained below, such that the size of the segments transmitted by the node 100 to the adjacent node no. 1 is optimal.

The node 100 is further suitable for detecting a modification of the routing table or link states and subsequent to such a detection, performing, based on the routing table or link states thus modified, a new determination of the adjacent node (adjacent node no. 2), to stop the transmission of segments of the block toward adjacent node no. 1 and to transmit the next segment to be processed to the newly determined adjacent node in that new routing decision.

The new routing decision is in particular applied to the segments that have been received by the node 100 before the new routing decision that has not yet been transmitted by the node 100 to adjacent node no. 1 (or in another embodiment, that have been transmitted, but for which the node 100 has not yet received an acknowledgment message indicating that adjacent node no. 1 has indeed received them). If applicable, the node 100 applies reformatting to the segments transmitted to adjacent node no. 2, as explained below, such that the size of the segments transmitted by the node 100 to that adjacent node no. 2 is optimal.

Thus, a routing decision is applicable by the node 100 to the segments, including segments only comprising useful data and not comprising a header with end recipient address (es); it is applied in that case based on the addresses of the recipients stored in the block background in correspondence with the unique reference of the block to which the segment belongs.

The node 100 is further able, following a routing decision to an adjacent node, based on information of the radio background (states of the layer L2) qualifying the link between the node 100 and that adjacent node, to transmit a sequence of block segments in groups of segments so as to optimize the transmission, or to transmit a sequence of block segments in the form of a sequence of smaller segments, so as to optimize the transmission.

This reformatting operation of the transmitted segments, comprising a fragmentation or reassembly of the received segments, is done by the node 100 such that the size of the transmitted segments is the optimal size, i.e., appropriate for an optimal transfer to the determined adjacent node.

This optimal size is for example determined based on an error rate and/or a transmission time on the link between the node 100 and the adjacent node and/or based on the directivity of that link. It is therefore the transmission states on the links between adjacent nodes that control transmission of the block in a group of segments or in smaller segments, in real time.

The error rate leads to detection and correction mechanisms. If the correction is done by repetition triggered by a lack of acknowledgment, the significant transmission time will lead to a late correction and therefore deteriorate the efficiency while tying up radio resources with unusable transmissions. Lastly, the directivity evaluates the extent to which a transmission from one node to a neighbor ties up the resource usable for other nodes adjacent to the node 100.

The node 100 is able to store, in the block background in its memory 102 corresponding to the unique reference of the block in question, the fragmentation/reassembly operations in a group of appropriate size for the characteristics of the radio link thus produced for a sequence of segments of the block.

In one embodiment, exchanges between the node 100 and the adjacent node to which the segments of an associated block with a unique reference are transmitted, allow the node 100 to inform the adjacent node of its intention to send it segments from the block while indicating the unique reference of the block. The adjacent node can then inform the node 100 of the segments that it is already storing in its block background associated with the unique reference. In this way, only the segments not yet received by the adjacent node (if applicable by nodes other than the node 100) will actually be relayed by the node 100 to the adjacent node.

In the prior art, in a node, the routing decision was made relative to a segment (which in the prior art indicated the addresses of the end recipients) received by the node, then the received segment was for example split by the node into several segments $A_1, \ldots, A_n$, and each of those segments $A_1, \ldots, A_n$ was transmitted by the node according to the routing decision made for the segment A.

As indicated above, in one embodiment of the invention, the routing decision is, on the contrary, able to be evaluated in light of each segment $A_i$, i=1 to n, resulting from a segmentation operation done within the node: the relay destinations can therefore be updated much more quickly within a node, without having to wait for the transmission of the segment A, which avoids needlessly occupying radio links.

Furthermore, since the addresses and recipients are not transmitted with each segment of the block, but are stored in the background of the block in the relay nodes, the volume of information to be transmitted between nodes is significantly lower.

The background of a block in a node thus stores the unique reference of the block, the addresses of the end users, the segments of the block received and sent by the node and, for each segment received (sent, respectively), the identifiers of the adjacent nodes having transmitted that segment to the node, as well as the corresponding dates and times of receipt (respectively the identifiers of the adjacent nodes to which the node transmitted the segment, as well as the corresponding sending dates and times.

Figure 2:
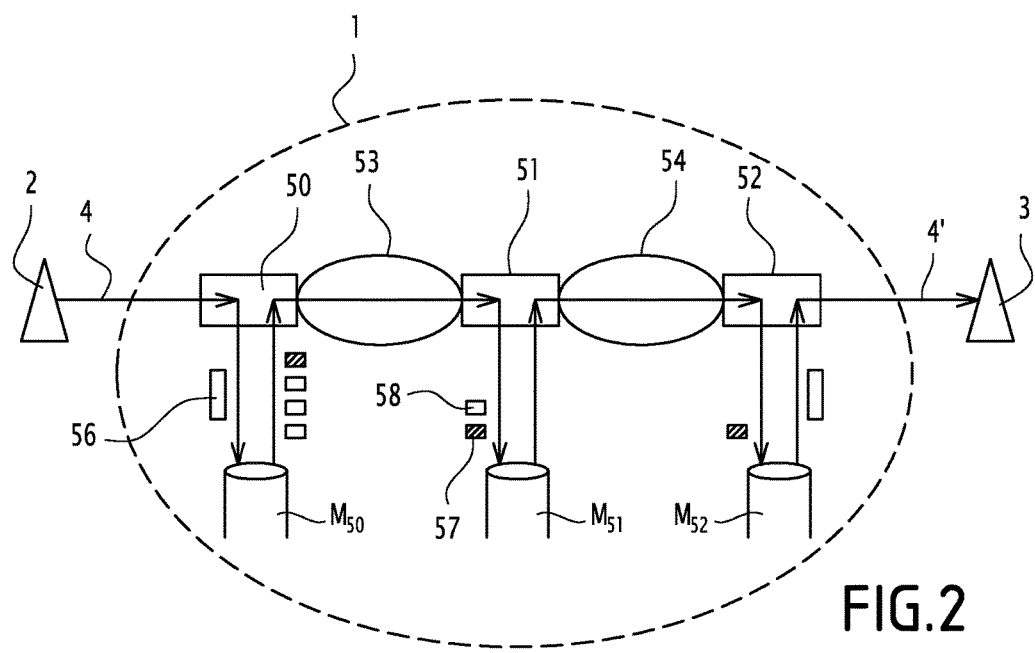
FIG. 2 shows a radiocommunication network in one embodiment of the invention.

In FIG. 2, the network 1 has a configuration in which a node 50 and a node 51 are connected by a radial hop 53, while the node 51 and a node 52 are in turn connected by a radio hop 54.

The nodes 50, 51 and 52 are similar to the node 100 described above in reference to FIG. 1.

Each of these nodes 50, 51 and 52, respectively, comprises a memory $M_{50}$, $M_{51}$, $M_{52}$, respectively, similar to the memory 102 shown in FIG. 1.

A piece of equipment 2, for example a computer, here called information source 2, is connected, for example via a wired link 4, to the node 50, which gives it access to the network 1.

A piece of equipment 3, for example a computer, here called information recipient 3, is connected, for example via a wired link 4', to the node 52, which gives it access to the network 1.

The information source 2 requests the transmission of a data block 56 to the information recipient 3. The data block 56 is provided to the node 50 by the information source 2. A block reference, unique in the routing domain associated with the network 1, is associated with the block 56 by the node 50.

The node 50 splits the block 56 into a plurality of segments.

The segments, the identifier of the recipient, the identifier of the adjacent node 51 and the date and time are stored in a block background associated with the unique reference of the block 56 in the memory $M_{50}$.

The first segment comprises the unique reference of the block.

The node 50 determines, as a function of its routing table, that the data block should be sent to node 51, from among the adjacent nodes, for the recipient 3. The node 50 therefore transmits the segments to the adjacent node 51, which, in turn, stores those segments in a block background associated with the unique reference received the first segment 57 with the other information of the block background.

The node 51 having correctly reassembled a block beginning in sufficient proportions (in light of a fixed and configurable criterion; here for example, the reception of the first two segments 57, 58), in turn transmits the received segments of the block 56.

Like the node 51, the node 52 initializes and fills in the block background associated with the block 56.

Once the node 52 has received the entire block 56, it returns it to the recipient 3, then releases the zone of the memory $M_{52}$ in which the block background associated with the block 56 was being stored.

Once the node 51 has received acknowledgment from the node 52 of proper receipt of the last segment of the block 56 received by the node 51, the node 51 also frees the memory resource in its memory $M_{51}$, in which the block background associated with the block 56 was stored.

The conveyance of the block 56 to the node 50 is also signaled to the node 50, identified owing to the chain of the identifiers stored in the background of the block 56 of the nodes, which likewise releases the memory resource in its memory $M_{50}$ for storing the background of 56. If the node 52 had a transmission link from 52 to 50, this signal could be sent to it directly without going through the node 51.

As illustrated above, the unique reference of a block is used to initialize a block background in a node on the route between a source and a recipient. If a downstream node receives segments associated with the same reference from several different upstream nodes of its radio neighborhood, and/or from a same node via several radio links (optionally between the downstream node and a same upstream adjacent node), the downstream node reassembles the segments and acknowledges their proper receipt from information stored in the associated background, in the memory of the downstream node, with that unique reference. For example, it informs each upstream adjacent node of the proper receipt of the segments sent by that upstream adjacent node.

The path used by the segments form a tree, the root of which is the node having stored the block in its entirety and the branches of which end up reaching at least the recipient node. In one embodiment, if a downstream node has already received segments whose list of upstream nodes contains the node N and it receives additional segments from an upstream adjacent node indicating that those segments also come from a node N, the downstream node can notify the node N directly.

Various advantages of embodiments of the invention in the mesh network 1 will now be shown in reference to the figures. The nodes shown in the different figures are similar to the node 100 of FIG. 1. Only some of the operations that they carry out and indicated above are explained below.

Figure 3:
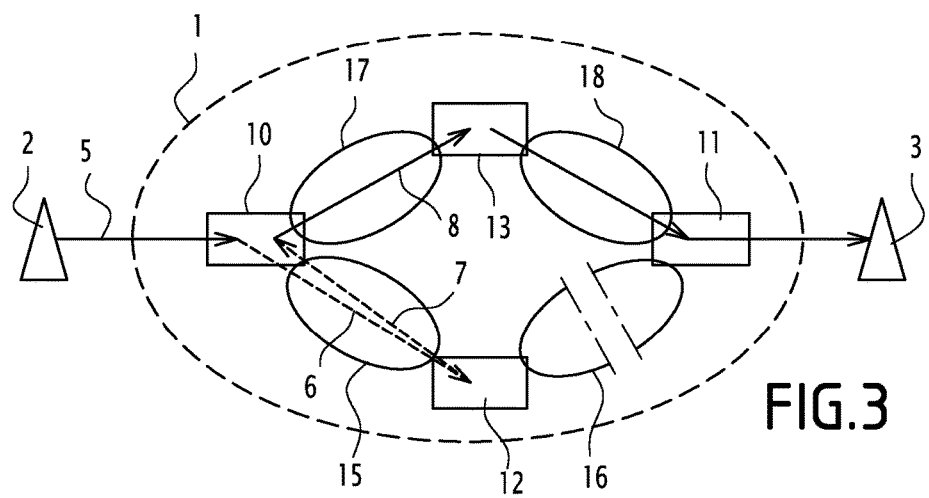
FIG. 3 shows a radiocommunication network in one embodiment of the invention.

In reference to FIG. 3, in the same manner as in FIG. 2, a source 2 connected to the mesh network 1 by a node 10 provides a data block to the node 10 (step 5) and requests its transmission to the recipient 3 accessing the network 1 by the node 11.

At that time, the adjacent nodes of the node 10 are the node 13 via a radio link 17 and the node 12 via a link 15. The nodes adjacent to the node 11 are the node 13 via a radio link 18 and the node 12 via a link 16.

The node 10 decides use its routing table to route the segments of the block to the node 12, and therefore begins to transmit the segments to the node 12 (step 6). Once the first segments of the block are stored by the node 12, they cannot be transmitted to the node 11, due to deterioration or cutoff of the link 16, detected by the radio link management function of the node 12. The node 12 sends the node 10 a message signaling (step 7) the loss of route for the block 10, indicating the unique reference of the block. Storing the block in the background of the node 10 will allow the routing of the block (step 8) toward the link 13, via the link 17, once those direct exchanges between the radio link management functions of the nodes 10 and 12 have signaled the route loss.

It is therefore the transmission states on the links between adjacent nodes that steer the rerouting of the segments, in real time.

In a DTN network of the prior art, the block would have been transmitted in a reliabilized manner (i.e., with acknowledgment implementation) between the two nodes 10, 12 and the route deterioration would have caused a backward return of the block from the node 12 to the node 10, and therefore resending of the block on the link 15.

In an IP network of the prior art, without implementing DTN, the node 10 would have transmitted packets to the node 12, and upon not receiving acknowledgment from the recipient, the node 12 would have retransmitted packets until an update in the network 1 of the routing table of the node 10 taking the deterioration of the link 16 into account.

This case shown in FIG. 3 thus illustrates an embodiment of the invention during transitional states of proactive routing.

The invention thus may make it possible to reduce radio resource consumption due to ineffective retransmissions and the additional conveyance times observed in the networks of the prior art: the flow time of a data block and the consumption of radio resources are minimized, in particular during topology fluctuations of the network.

Figure 4:
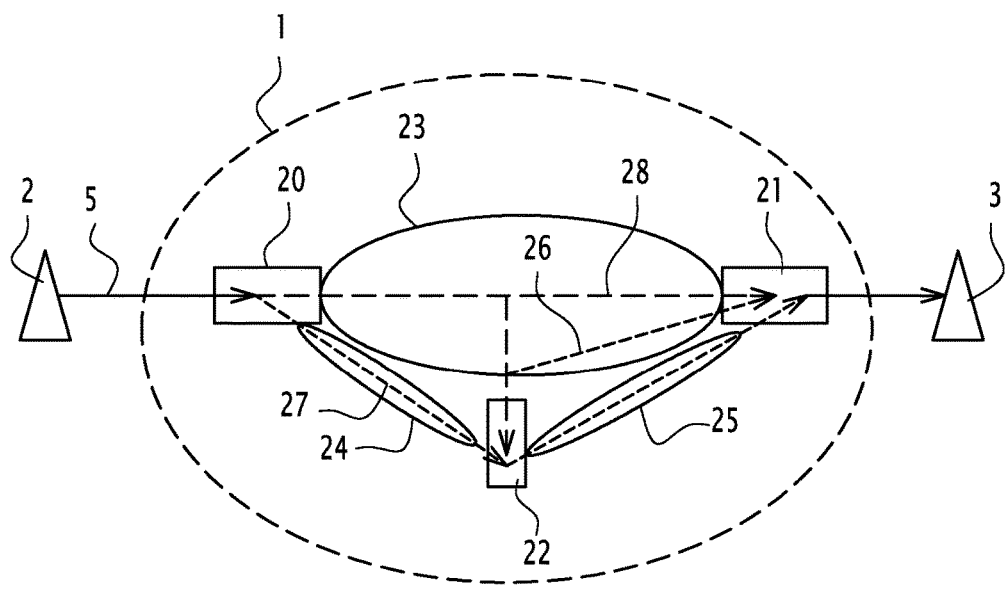
FIG. 4 shows a radiocommunication network in one embodiment of the invention.

In the case shown in FIG. 4, a source 2 connected to the mesh network 1 by a node 20 provides a data block to the node 20 (step 5) and requests transmission thereof to the recipient 3 accessing the network 1 via the node 21.

At that time, the node 20 has, as adjacent node, the node 21 via a radio link 23 and the node 22 via a link 24 and also via the link 23. In addition to the node 20 and the node 22 via the link 23, the node 22 is adjacent to the node 21 via a radio link 25. The link 23 is stable and allows a simultaneous broadcast of information to the nodes 21 and 22. The links 24 and 25 are not very stable, but sometimes offer high throughputs.

When the node 20 makes its routing decision, it uses the link 24, since it knows the lower-cost route toward the node 21 via 22 according to the metrics of the distributed routing protocol. The node 20 thus transmits (step 27) the segments of the block to the node 22, which thus progressively stores the block in its associated block background.

A deterioration of the link 25 between the nodes 22 and 21 requires the node 22 to use the link 23 and the link 25 in parallel (steps 25 and 26) to convey the segments of the block that it has stored until then to the node 21.

Once the exchanges on the states L2 teach the node 20 that the node 22 is using the links 25 and 23 to reach the node 21, the node 20 stops the transmission on the link 24 of the segments of the block that have not yet been transmitted to the node 22. Then, the node 20 transmits the balance of the segments of the link 23 (step 28), this time sending them to the adjacent destination node 21.

The destination node next reassembles the set of segments received from the various links and nodes owing to the unique reference associated with the block.

In a DTN network of the prior art, once the block was received by the node 22, it would have been split into sub-blocks. The first sub-block would have followed the route between the nodes 22 and 21 via the link 25; the second sub-block would have followed the route between the nodes 22 and 21 via the link 23.

In an IP network without DTN storage, the node 20 would have sent packets along the route 20-22-21 via the links 24, 25, with retransmissions during packet losses due to deterioration and route changes.

The progressive segmentation and reassembly according to embodiments of the invention steered by the reliabilization mechanisms between adjacent relay nodes make it possible to take the opportunities for link deteriorations into account without waiting for a convergence of the routing protocol, and with a reduced reactivity time. These reliabilization mechanisms can comprise error control methods with repeat request (ARQ Automatic Repeat reQuest) and/or error correction methods by coding (FEC, Forward Error Correction).

This case shown in FIG. 4 thus illustrates their reactivity, and the savings in conveyance time, that embodiments of the invention allow faced with the radio link opportunities and deteriorations.

Figure 5:
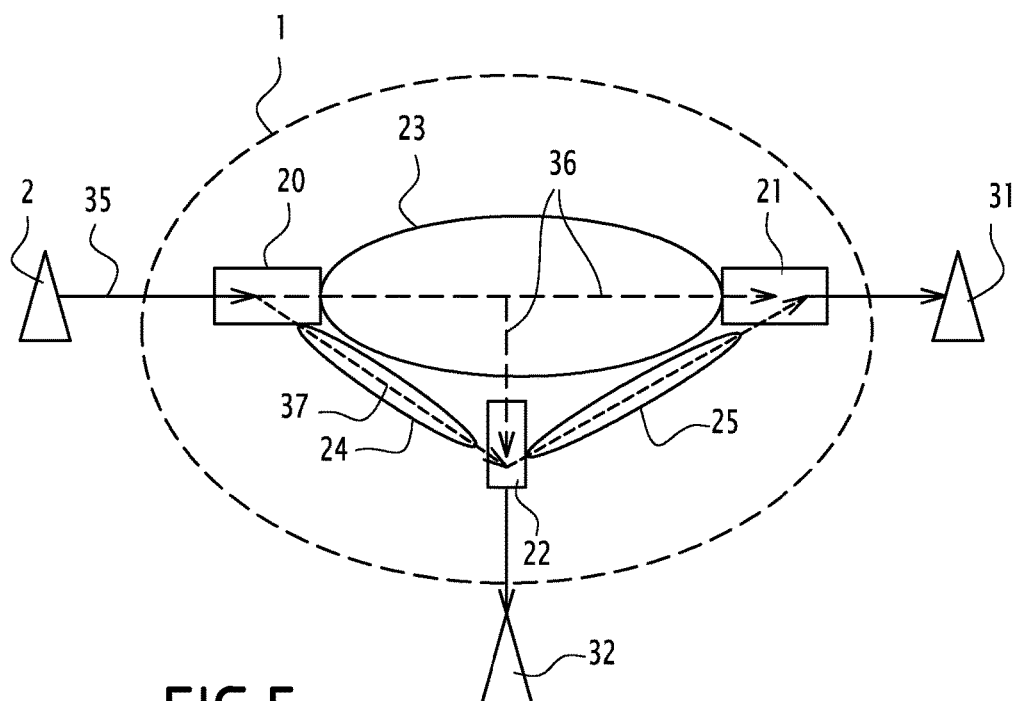
FIG. 5 shows a radiocommunication network in one embodiment of the invention.

In the case of FIG. 5, a source 2 connected to the mesh network 1 by a node 20 provides a data block to the node 20 (step 35) and requests its transmission to the recipients 31 and 32 accessing the network 1 via the node 21 and the node 22, respectively.

Adjacent to the node 20 are the node 21 via a radio link 23 and the 22, via a link 24 and the link 23. In addition to the node 20 and the node 22 via the link 23, the node 22 is adjacent to the node 21 via a radio link 25. The link 23 is stable. The links 24 and 25 are not very stable, but sometimes offer high throughputs.

The case shown in FIG. 5 illustrates the use of the broadcast capabilities according to an embodiment of the invention. The node 20 makes the following routing decision: it transmits the segments of the block to the node 22 on the link 24 (step 37) and in parallel transmits them on the link 23 to the nodes 22 and 21 (step 36). The node 22 further transmits those of the segments of the block that have not yet been received by the node 21, due to a much lower throughput on the link 23 than on the links 24 and 25, to the node 21 via the link 25. This parallelization of the transmissions will ease the reliabilization.

In a DTN network of the prior art implementing reliabilization of the TCP type between the DTN nodes, the transmission would not have been able to benefit from multicast conveyance on the link 23.

In an IP network of the prior art, the use of the broadcast capabilities of the radio requires the conveyance of the IP packets by a broadcast tree, the establishment and maintenance of which generate the signal to be transmitted in addition to the block itself.

Figure 6:
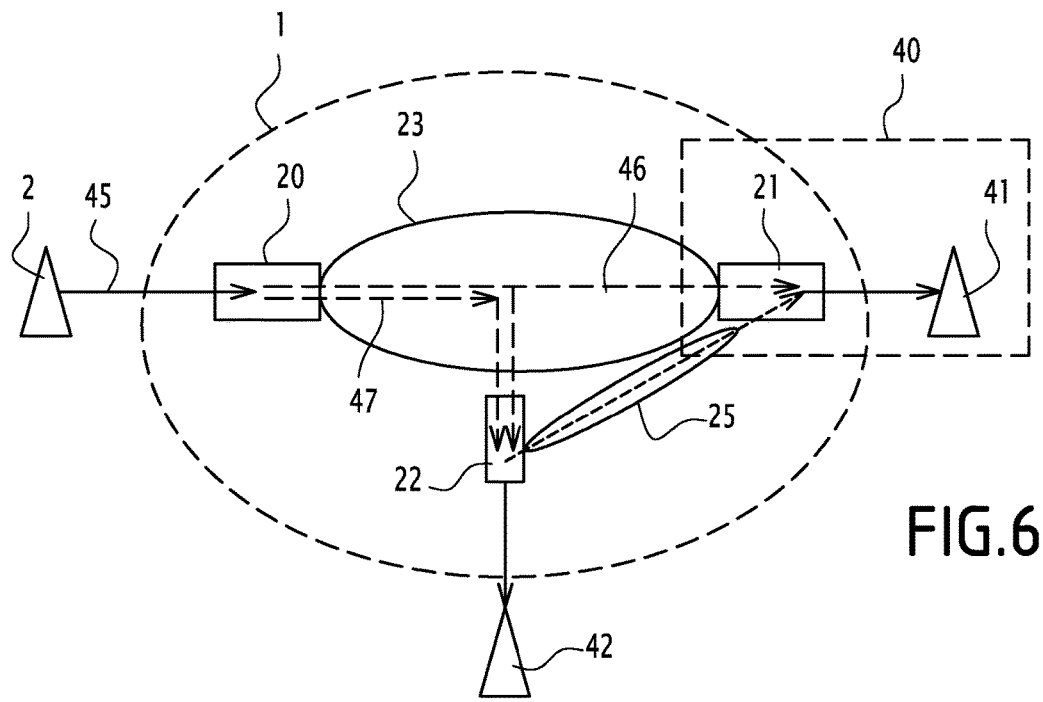
FIG. 6 shows a radiocommunication network in one embodiment of the invention.

In the case of FIG. 6, adjacent to the node 20 are the node 22, and sometimes the node 21 depending on its geographical position, via a shared radio link 23.

The node 21 sometimes is sometimes adjacent to the node 22 (depending on its geographical position) also via a radio link 25.

A source 2 connected to the mesh network 1 by a node 20 provides a data block to the node 20 (step 45) and requests its transmission to the recipients 41 and 42 accessing the network 1 via the node 21 and the node 22, respectively.

When the node 20 makes its routing decision, the recipient 41 is not reachable because of the geographical position of the node 21.

The node 20 transmits the first segments of the block to the node 22 on the link 23. These first segments are received only by the node 22. The node 21 then enters the network 1 and finds itself in radio connection 23 with the node 20 and in radio connection 23 and 25 with the node 22. The node 20 then continues the transmission of the segments of the block remaining to be transmitted on the link 23, to the nodes 21 and 22, while the node 22 transmits the first segments of the block that it had stored to the node 21 via the link 25.

The coordination of one or two hops between the original, relay and recipient nodes regarding the segments of a block that is permitted by storing the block backgrounds according to embodiments of the invention optimizes the transmission in case of mobile nodes.

Thus, the operation of a network in the embodiments as described above implements the following rules:
  assigning each data block to be conveyed a unique reference in the network, associated with a routing domain;
  sharing, in all of the nodes processing the data block or part of the block, that reference in order to identify and store a block background;
  using dynamic hop-to-hop routing to update routing tables that are consistent on all of the relay nodes;

building and maintaining a multicast broadcast tree at each relay node for multicast conveyance based on the routing information;

transmitting the segments from hop to hop in a reliabilized manner (i.e., with acknowledgment of receipt) according to the routing information while allowing, during the transmission, the interruption of transmission on deteriorated or broken links and the use of new links detected by the node;

resuming, at each relay node based on new consistent routing information updated since the beginning of the transmission of the block on the network, the transmission of a partially transmitted block using the unique reference in preamble so as not to retransmit information already stored by the following relay node;

informing the nodes having transmitted the block, or part of the block, of the progression of the block on the network;

freeing the storage space of a node when the conveyance of the block has progressed by N intermediate nodes past the node (N being a fixed integer, greater than or equal to 2).

Embodiments of the present invention require storing segments of data blocks and block background information relative to the data block and thus make it possible to correct effects of poor nodes-relay routing decisions and minimize the retransmissions of fragments during reliabilization.

Embodiments of the present invention make it possible to take advantage of variations in the availability of the wireless links, distribute traffic on the available links and reduce the transmissions of information due to erroneous repetitions, rerouting, etc.

Figure 7:
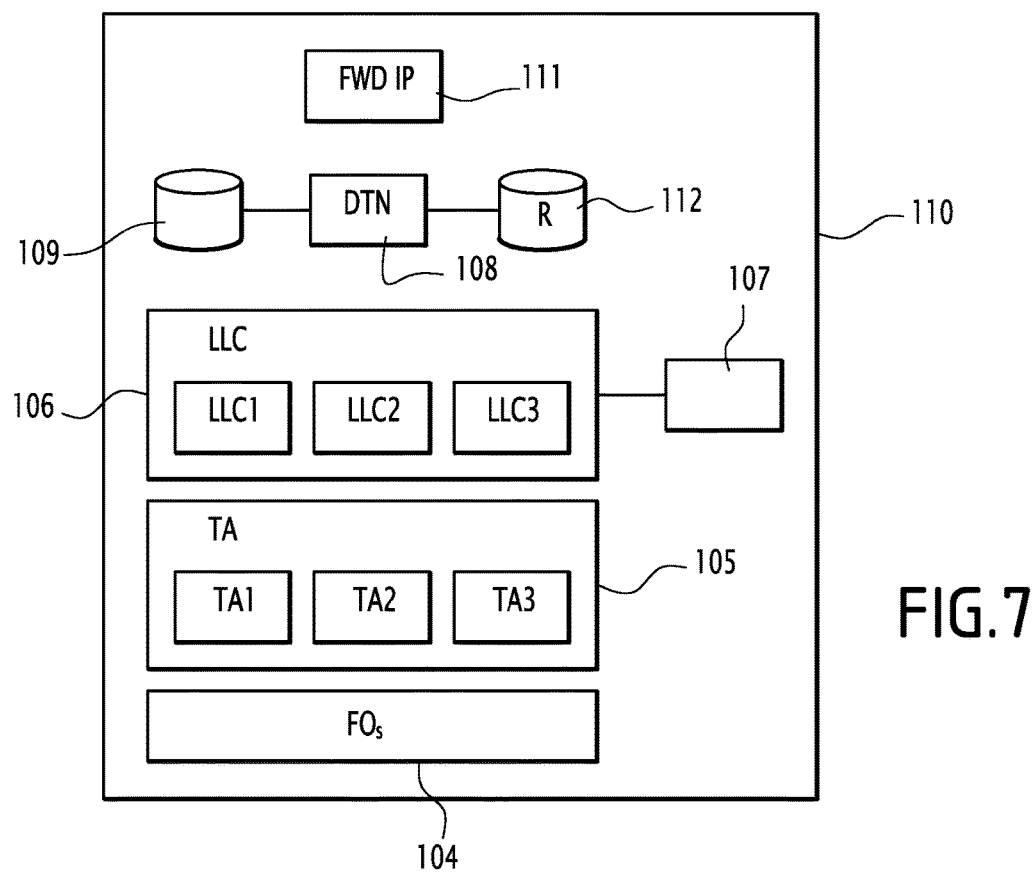
FIG. 7 shows a radio node in one embodiment of the invention.
Figure 8:
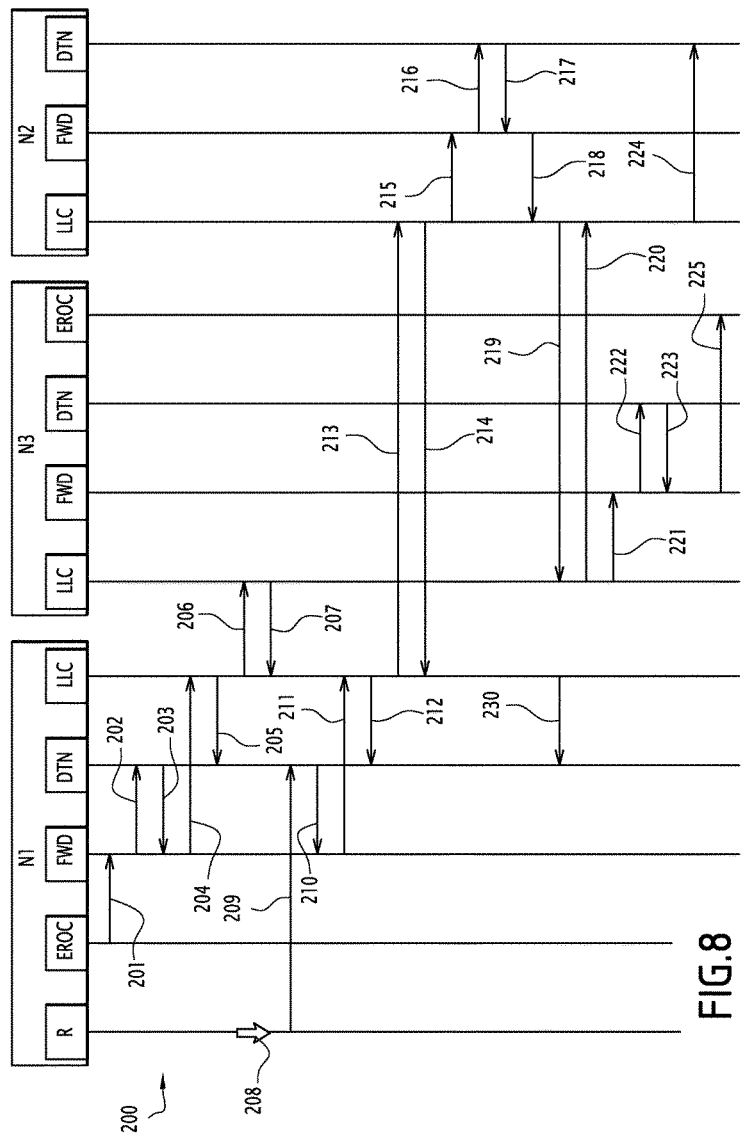
FIG. 8 shows a flowchart of steps carried out in one embodiment of the invention.

FIGS. 7 and 8 illustrate one example embodiment of the invention.

FIG. 7 is a view of the architecture of a node 110 in one embodiment of the invention. The node 110 comprises a "waveform" module 104 suitable for sending, putting the data to be sent in the format necessary for radio transmission according to the standards (UHF, VHF, etc.) selected for transmission and reception, in order to process the received data in the necessary format for radio transmission.

A TA module 105 allows the node to process several radio link instances at the same time (here three instances: TA1, TA2, TA3) while making the processing done by the node uniform in the blocks mentioned below.

The node 110 comprises an LLC radio link management module 106 in which each radio link instance is subject to appropriate management by respective layers L2 (LLC1, LLC2, LLC3). The LLC management module 106 is associated with a database 107 storing the reliabilization background information in correspondence with unique block references.

The node 110 further comprises a DTN module 108 associated with the database 109, in which the received block segments are stored in correspondence with their unique block reference. A "topology" database R112 provides the DTN module 108 with consistent dynamic routing information (routing calculation) and also, in the case at hand, neighborhood topology discovery information. An IP switching module 111 ("Forwarder IP") is responsible for switching the IP packets.

The databases 107 and databases 109 are connected.

In this embodiment, the information block is an IP packet that can be large (jumbogram IPv6) and each block is reassembled upon each hop.

FIG. 8 shows the exchanges between 3 nodes N1, N2, N3 similar to the node 110 of FIG. 7, implementing the following functions:

EDGE: interface function between the network and the block sources/recipients;

FWD: IP packet switching implemented using the IP switching block 111;

R: routing function grouping together topology discovery and the route calculation implemented using the database R112;

DTN: block storage and segmentation/reassembly function implemented using the DTN block 108;

LLC: a reliabilization function between nodes implemented using the LLC block 106.

In a step 201, an information block (a packet called D3), intended for two recipients, one connected to the node N2, the other to the node N3, is received from a source by the node N1, and is provided by the EDGE function to the FWD function. The latter points it toward the DTN function (step 202), which assigns it its unique block reference, stores the latter with the packet D3 in its database 109, before providing it again, with its unique block reference, to the FWD function (step 203). The routing decision is to transmit the block to the first adjacent node N3 via a VHF means, based on the knowledge of the topology of the network and the application of routing metrics of the R function. The block D3 is therefore provided to the LLC function of the node N1 with the instruction to send it to N3 on the VHF means (step 204).

The LLC function of the node N1 indicates the beginning of transmission of the packet (step 205) to the DTN function of N1, during the prior exchange with N3. In a step 206, 15 out of 100 segments of the packet D3 are transmitted correctly. The adjacent node N3 acknowledges proper receipt of the first 10 (step 207).

In a step 208, the R function of the node N1 determines the occurrence of a new radio link (UHF means) with the node N2, a new neighbor of N1. This opportunity is indicated to the DTN function, which then scans the list of blocks being transmitted in the database 109 (step 209). The DTN function then relaunches switching of the blocks being transmitted that are affected by the change in neighborhood (step 210). An instruction is provided by the DTN function to the LLC function of the node N1, indicating that the block D3 is to be transmitted on the UHF means to the new node N2 (step 211). The LLC function of the node N1 indicates the beginning of transmission of the packet (step 212) to the DTN function of N1, during the prior exchange with N2. The 100 segments of the block D3, or the entire block D3, are transmitted by the LLC function from the node N1 to the node N2 (step 213), which receives them. An acknowledgment of proper receipt of the 100 packages is transmitted by the LLC function of the node N2 to the LLC function of the node N1 (step 214), leading to the provision of end-of-processing information of the packet D3 to the DTN function and the release of the memory zones occupied in the node N1 by the block D3 and the associated background information (step 230).

The complete reassembled block D3 is returned to the DTN function, via the LLC and FWD functions (steps 215, 216), which stores them and sees to continuing the conveyance of the block.

Since the node N3 had not completely received the block D3, the node N1 indicated, in the block D3 transmitted to the node N2, the instruction to transmit the block to the recipient attached to the node N3. The DTN function of the node N2 then decides to route the block toward the adjacent node N3 and transmits the block D3 and the routing instruction to the FWD function (step 217), which points it toward the LLC function of the node N2 (step 218).

The LLC function of the node N2 transmits the unique reference of the block D3 to the LLC function of the node N2. The LLC function of the node N2 indicates in response that it has received the first 10 segments of D3, then the remaining 90 segments are transmitted by N2 on the UHF means to the node N1 (step 219), which acknowledges proper receipt thereof (step 220). Once that acknowledgment is received, the LLC function of the node N2 provides the end-of-processing information of the packet D3 to the DTN function of the same node, and the memory zones occupied in the node N2 by the block D3 and the associated background information are released (step 224).

In the node N3, the block D3 is pointed, via the FWD function, toward the DTN function for storage of the block and its block background (steps 221, 222). Then the block D3 is returned, from the DTN function and via the FWD function, to the EROC function (steps 223, 225). It will be noted that steps similar to steps 223, 225 are carried out within the node N2 to deliver the block to the recipient connected to the node N2.

What is claimed is:

1. A communication method in a wireless telecommunications network comprising wireless telecommunications nodes, the method comprising, during the transmission of a data block from a source node to a destination node, the method comprising the following steps implemented by a node, the node comprising a routing table in a memory of the node and being the source node or a relay node receiving and transmitting at least some segments of the block:
    selecting based on at least one content of the routing table of the node corresponding to the destination node and/or depending on states of the wireless telecommunications connections between the node and adjacent nodes of the node, a first adjacent node from among the adjacent nodes to the node, the node having stored a set of segments of the data block;
    determining an appropriate segment size for a transfer to the first adjacent node;
    reformatting at least one segment from the set of segment(s) based on the determined segment size;
    sending at least the reformatted segment to the first determined adjacent node;
    detecting a modification of the routing table and/or a modification of the state of the wireless telecommunications links between the node and the adjacent nodes, and following that detection;
    selecting a second adjacent node;
    stopping the transmission to the first adjacent node of the set of segments stored before the detection;
    determining an appropriate segment size for a transfer to the second determined adjacent node;
    reformatting at least one segment from the set of segments not yet transmitted to the first adjacent node based on the determined segment size for the transfer to the second adjacent node; and
    transmitting the at least one reformatted segment from the set of segments to the second adjacent node.

2. The communication method as recited in claim 1 wherein the node receives messages from the first adjacent node acknowledging receipt by the first node of some of the transmitted segments and wherein:
    the node does not send the second adjacent node the segments whereof receipt has been acknowledged by the first adjacent node; and/or
    when the node has not received a message from the first adjacent node acknowledging proper receipt of the segment transmitted to the first adjacent node, the node transmits the reformatted segment to the second adjacent node following the detection based on the determined segment size for transfer to the second adjacent node.

3. The communication method as recited in claim 1 wherein an appropriate segment size for transfer to an adjacent node is determined based on at least one parameter from among an error rate on the wireless communications link between the node and the adjacent node, a transmission delay on that link, and the maintenance of available resources for another neighbor on the link.

4. The communication method as recited in claim 1 further comprising the following steps for each node implemented to transmit a block from the source node to the destination node:
    storing, following receipt of segments from the data block, the received segments in correspondence with their unique reference in the memory of the node;
    when the respective node relays at least some of the segments received from the block to an adjacent node and no segment from the block has been exchanged yet between the node and adjacent node, transmitting the segments of the block and the unique reference associated with the block; and
    following the receipt by the respective node of the unique reference of the block transmitted by an adjacent node with which the node has not yet implemented any exchange of segments of the block, indicating the segments of the block already stored in the memory of the node to the adjacent node.

5. The communication method as recited in claim 4 wherein the node maintains, in the memory thereof, in correspondence with the unique reference of the block:
    the list of adjacent nodes to which the node has relayed segments from the block and stores, in correspondence with each of the adjacent nodes, the segments of the block that the node has sent the adjacent nodes; and/or
    the list of adjacent nodes that have relayed segments from the block to the node and stores, in correspondence with each of the adjacent nodes, the segments of the block that the node has received from the adjacent node.

6. The communication method as recited in claim 5 wherein the node further indicates, in the memory thereof, in correspondence with the segments of the block relayed to each adjacent node of the list, whether acknowledgments of receipt of the segments from the block by the adjacent node have been received by the node.

7. The communication method as recited in claim 4 wherein at least some of the segments of a block received by the node comprise a header indicating the address of the adjacent node, but do not comprise a header indicating a destination node address, the node, following the receipt of segments from the block, identifying the destination node used to select an adjacent node to which to transfer the segments each node, by extracting the address from the memory thereof of a destination node previously stored in correspondence with the unique reference of the block.

8. The communication method as recited in claim 1 wherein the segments of the data block remain stored in the memory of the node as long as a message acknowledging proper receipt of the segments by a node situated N hops away on the route toward the destination node has not been received by the node, N being fixed and greater than or equal to 2.

9. The communication method as recited in claim 1 wherein after receiving segments of a data block sent to several recipient nodes, the node uses the broadcast capabilities of a link with neighbors of the node so as not to replicate the segments to be transmitted.

10. The communication method as recited in claim 1 wherein when segments of the block have already been exchanged between the node and an adjacent node, additional segments of the block are exchanged between the node and the adjacent node without transmitting the unique reference associated with the block and by transmitting, with the additional segments of the block, a reference of the block, local to the hop between the nodes and adjacent node, the correspondence between the unique reference and the local reference being stored in the memory of the node.

11. A computer program on a non-transitory computer readable medium to be installed in a node of a wireless telecommunications mesh network, the program comprising instructions to carry out the steps of the method as recited in claim 1 when the program is executed by a processor of the node.

12. A data transceiver set suitable for constituting a node of a wireless telecommunications mesh network, comprising:
    a wireless transceiver; and
    a memory comprising a routing table, the data transceiver set being suitable for storing a set of segments of a data block to be transmitted to a destination node and for selecting, based on at least one content of the routing table of the data transceiver set in correspondence with the destination node and/or based on states of wireless telecommunications links between the data transceiver set and adjacent nodes of the data transceiver set, a first adjacent node from among the adjacent nodes of the data transceiver set, in order to determine the segment size appropriate for a transfer to the first selected adjacent node, reformat at least one segment from the set of segments based on the determined segment size, and transmit at least the reformatted segment to the determined first adjacent node via the wireless transceiver,
    the data transceiver set being adapted for detecting a modification of the routing table and/or a modification of the state of the wireless telecommunications links between the data transceiver set and adjacent nodes of the data transceiver set, and following the detection, selecting a second adjacent node, stopping the transmission to the first adjacent node of the set of segments stored before the detection, to determine an appropriate segment size for a transfer to the second determined adjacent node, reformatting at least one segment from the set of segments not yet transmitted to the first adjacent node based on the determined segment size for the transfer to the second adjacent node and transmitting the at least one reformatted segment from the set of segments to the second adjacent node via the wireless transceiver.

13. The data transceiver set as recited in claim 12 wherein the data transceiver set is adapted to receive messages from the first adjacent node acknowledging receipt by the first node of some of the transmitted segments and adapted for:
    not sending the second adjacent node the segments whereof receipt has been acknowledged by the first adjacent node; and/or
    when the data transceiver set has not received a message from the first adjacent node acknowledging proper receipt of the segment transmitted to the first adjacent node, transmitting the reformatted segment to the second adjacent node following the detection based on the determined segment size for transfer to the second adjacent node.

14. The data transceiver set as recited in claim 13 wherein the data transceiver set is adapted to store the segments of the data block in the memory of the node as long as a message acknowledging proper receipt of the segments by a node situated N hops away on the route toward the destination node has not been received by the set, N being fixed and greater than or equal to 2.

15. The data transceiver set as recited in claim 12 wherein the data transceiver set is adapted for determining an appropriate segment size for transfer to an adjacent node based on at least one parameter from among an error rate on the wireless communications link between the set and the adjacent node, a transmission delay on the wireless communications link between the set and the adjacent node, and the maintenance of available resources for another neighbor on the wireless communications link between the set and the adjacent node.

16. The data transceiver set as recited in claim 12 wherein the data transceiver set is adapted, following receipt of segments from the data block, for storing the received segments in correspondence with their unique reference in the memory of the node, the data transceiver set being adapted so that during relaying of at least some of the segments received from the block to an adjacent node, in the case where no segment from the block has been exchanged yet between the set and the adjacent node, transmitting the segments of the block and the unique reference associated with the block, the data transceiver set further be able, following the receipt by the node of the unique reference of the block transmitted by an adjacent node with which the set has not yet implemented any exchange of segments of the block, to signal the segments of the block already stored in the memory of the node to the adjacent node.

17. The data transceiver set as recited in claim 16 wherein the data transceiver set is able to maintain, in the memory thereof, in correspondence with the unique reference of the block:
    a list of adjacent nodes to which the data transceiver set has relayed segments from the block and to store, in correspondence with each of the adjacent nodes, the segments of the block that the data transceiver set has sent the adjacent nodes; and/or
    a list of adjacent nodes that have relayed segments from the block to data transceiver set and to store, in correspondence with each of the adjacent nodes, the segments of the block that the data transceiver set has received from the adjacent node.

* * * * *